United States Patent Office 3,740,383
Patented June 19, 1973

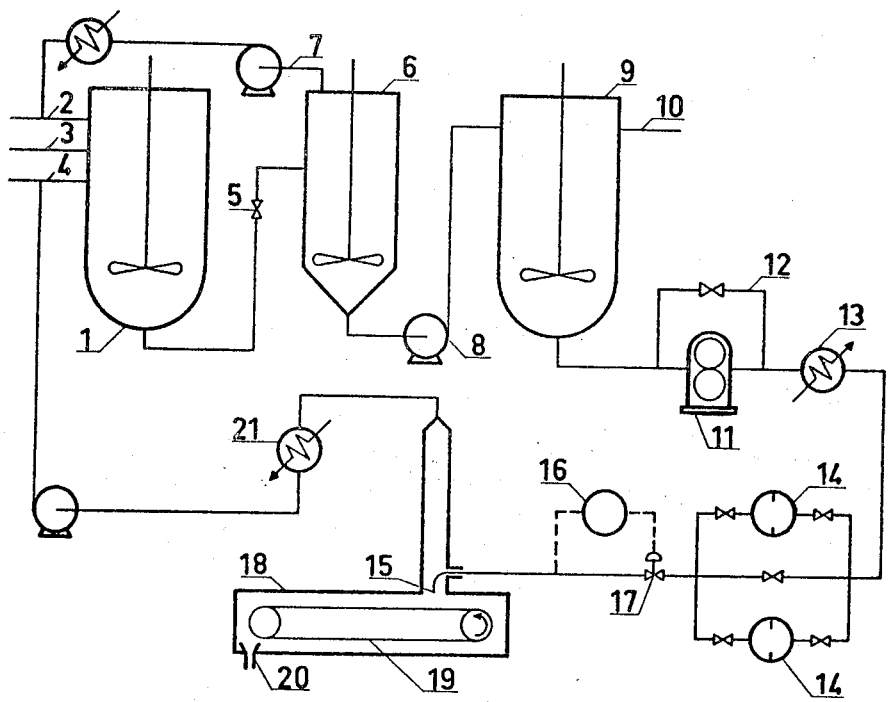

3,740,383
PROCESS FOR THE PRODUCTION OF
FIBRILLATED STRUCTURES
Rodolfo Gabellieri and Michel Osterrieth, Rosignano-Solvay, Italy, assignors to Solvay & Cie, Brussels, Belgium
Filed Dec. 11, 1969, Ser. No. 884,067
Claims priority, application France, Dec. 13, 1968, 178,330
Int. Cl. C08f 3/04, 15/04
U.S. Cl. 260—88.2                                    9 Claims

ABSTRACT OF THE DISCLOSURE

Fibrillated structures of polyethylene and copolymers of ethylene are produced directly from the polymerization or copolymerization of ethylene. The polymerization is carried out in a diluent under low pressure and in the presence of a catalyst having an activity of at least 5000 g. of polymer per gram of metal present in the catalyst. Unreacted ethylene is allowed to escape and the mixture of the polymer in the diluent is then heated under at least autogeneous pressure. The fibrillated structure is produced by the instantaneous vaporization of the diluent by transfer of the diluent-polymer mixture through an orifice and into an enclosure maintained under low pressure.

BACKGROUND OF THE INVENTION

The present invention relates to an integrated process for the production of high density polyethylene fibrillated structures, directly from ethylene.

It is known to prepare multi- and mono-filaments from polyolefins (Fourné, Synthetische Fasern, Wissenschaftliche Verl., Stuttgart, 1964, p. 186 et seq.). Among the polyolefins suitable for this purpose, low pressure polyethylene and stereoregular polypropylene are of special interest.

High density polyethylene can be spun dry. However, dry spinning has no practical importance and, on an industrial basis, melt spinning is preferred (op. cit., p. 188).

High density polyethylene is produced under low pressure, usually in solution or in suspension in a hydrocarbon, in the presence of a hexavalent chromium oxide or a derivative of a transition metal, which may be combined with a support, and an organometallic compound. The effluent from the polymerization reactor contains a solvent or diluent, polymer, unreacted monomer and catalytic residues. The polymer is in solution or in suspension depending on the temperature and the nature of the hydrocarbon.

The unreacted ethylene is generally separated by reducing the pressure and recycled to the polymerization reactor. The catalytic residues very often comprise compounds which are detrimental to the quality of the finished product and which are present in excess quantities. Therefore, these residues must be removed for example by filtration if they are solid and the polymerization is carried out in solution, or by chemical solubilization followed by extraction. Finally, the polymer is recovered by eliminating the solvent, for example by filtration, evaporation, centrifugation or a combination of these operations.

Following these operations, the polymer is fluffy, not too easy to handle, and has an apparent density which is not very high. Before transforming the polymer into a filament, it is usually melted in a screw extruder and then granulated.

The above operations including separation, purification and finishing are extremely costly in terms of capital investment and energy; the equipment used for these purposes form the most important portion of the polymerization installation.

In order to be melt-spun into multifilaments, the polymer is first melted then extruded through a multiple orifice extrusion die. The extruded material is drawn in melted condition, then solidified.

As such, the multifilaments are unusable since their mechanical properties are unsatisfactory. These properties may be improved, however, by submitting the extruded articles to one or more drawing operations which are generally carried out at a temperature higher than room temperature. For many applications, finishing of the multifilaments may be completed by carrying out other operations such as texturizing cutting into short staples, etc.

The filament finishing operations require substantial material investments and a large crew for handling and supervision.

SUMMARY OF THE INVENTION

It has now been found that it is possible to produce from the effluent of the polymerization reactor without separation of the diluent or removal of the catalytic residues, bulky fibrillated structures which can be used directly in spun form.

The process according to the invention comprises polymerizing or copolymerizing ethylene under low pressure in the presence of a catalyst having an activity higher than 5000 g. of polymer per g. of metal present in the active elements of the catalyst, in admixture with a diluent in which the resultant polymer is suspended, separating the unreacted ethylene by expansion, warming up the suspension under its own pressure or a higher pressure to a temperature high enough to completely liquefy the polymer and to accumulate enough heat to assure the subsequent complete vaporization of the diluent, the temperature being not above that which permits solidification of the polymer during vaporization of the diluent, and finally expanding the mixture of liquid polymer and diluent by transferring the same into an enclosure maintained under pressure sufficiently low to cause instantaneous vaporization of the diluent and solidification of the polymer in the form of a fibrillated structure.

According to the invention, it has been found that the present process is desirably carried out in an apparatus comprising a polymerization reactor provided with agitation means, means for feeding ethylene, diluent and catalyst to the reactor, a gas removing enclosure also provided with agitation means, means for fluid communication between the polymerization reactor and the gas removing enclosure, means for creating a fluid pressure drop in the fluid communication means, heating means for heating the suspension of polymer in the diluent and means receptive of the heated suspension effective to instantaneously vaporize the diluent.

BRIEF DESCRIPTION OF THE DRAWING

The drawing illustrates schematically an embodiment of the process of the invention carried out in an installation of the invention.

DESCRIPTION OF THE PREFERRED EMBODIMENTS

According to the invention, the first stage of the process comprises the polymerization or copolymerization of ethylene. Homopolymers of ethylene as well as ethylene copolymers which contain ethylene as the major constituent, i.e. above 50% molar; and preferably, in a proportion of about 90% molar are produced according to the present invention. Among the comonomers which are copolymerizable with ethylene, the olefins having one or more double bonds comprising at least one double bond at the end of the chain are preferred, such as propylene, butene-1, 4-methyl-pentene-1, butadiene or styrene. These comonomers are generally incorporated in the molecule at the rate of a few molar percentages, i.e. 10% or less and this has the general effect of modifying the mechanical properties of the polymer and to decrease its specific weight. It is also possible to improve other properties such as dyeing capacity and adhesiveness by such copolymerization.

Polymerization is carried out in the presence of a diluent which is generally selected from the group consisting of aliphatic or cycloaliphatic hydrocarbons such as butane, pentane, hexane or cyclohexane. A hydrocarbon having a boiling point, under normal pressure, lower than the melting point of the polymer is preferred. For example, in the case of a homopolymer, the boiling point should be lower than 120° C.

The enclosure in which the instantaneous vaporization of the diluent is carried out should not be kept at a pressure lower than normal.

It has been found that the elimination of catalytic residues may be avoided in the present process providing the catalyst is sufficiently active, whereby undesirable properties due to the presence of whole catalytic residues in the polymer are prevented. The undesirable properties result only from the catalyst constituents originating from the active elements of the catalyst. For example in the case of supported catalysts, the presence of significant residues originating from the support generally has no undesirable consequences. On the other hand, the metallic derivatives originating from the active element of the catalyst cannot be tolerated above a certain concentration. Accordingly, the catalyst which is used should possess a sufficient activity with respect to the quantity of active metallic derivatives present in the catalyst. According to the invention, the catalytic activity should be higher than 5,000 g. of polymer per g. of metal preferably higher than 10,000 g. per g.

The catalysts which are especially suitable to carry out the invention include an organometallic compound as a first component, and a second solid component which is obtained by reacting in the absence of diluent, a liquid derivative of a transition metal with an anhydrous solid compound of a bivalent metal. Catalysts of this type have been described in French Pat. No. 1,516,800 dated Oct. 21, 1966, and the corresponding U.S. patent application Ser. No. 676,738 of Oct. 20, 1967.

The organometallic compound, which is the first component of the catalytic system, is selected from the group comprising the organic derivatives of the metals of Groups I, II, IIIa and IVa of the Periodic Table.

As used herein, the term organometallic compounds includes organosilicon compounds in accordance with the usage in Organometallic Chemistry—Selected Topics in Modern Chemistry by E. G. Rochow, Reinhold Publishing Corp., 1964 and The Chemistry of Organometallic Compounds, by E. G. Rochow, D. T. Hurd and R. N. Lewis, John Wiley and Sons, 1957. Examples of these compounds include the organometallic halides, including both mono- and polyhalides, hydrides and completely alkylated derivatives of these metals, for example, the dialkyl aluminum halides, the alkyl magnesium halides, the alkyl aluminum hydrides, the alkyl tin hydrides and the organic compounds of silicon having at least one Si-H bond. Specific examples of organometallic activating compounds include triethylaluminum, triisobutylaluminum, tri-n-octylaluminum, diethylaluminum chloride, ethylmagnesium bromide, diisobutylaluminum hydride, tri-n-butyltin hydride, triethylsilane, methyl hydrogen silicone oil. The trialkyl aluminum compounds are preferred.

The liquid derivatives of the transition metals which are used in the preparation of the second component are selected from the group consisting of the derivatives of the metals of Groups IVb, Vb and VIb of the Periodic Table for example the halides, oxyhalides, alkoxides, haloalkoxides and more particularly, comprise the chlorinated derivatives of titanium and vanadium such as $VOCl_3$ and $TiCl_4$, however other compounds such as $CrO_2Cl_2$ may also be used.

The bivalent metal compound is a solid compound and is preferably selected from the group consisting of compounds of calcium, zinc and magnesium, the last mentioned being preferred. Mixed compounds of two or more bivalent metals may also be used. Among the compounds suitable as solid supports, the following may be cited: hydroxy-halides, simple or complex oxides and hydroxides and salts of inorganic oxyacids such as sulphates, nitrates, phosphates or silicates. The salts of mono- or polycarboxylic organic acids are also suitable, especially those derived from macromolecules containing carboxylic groups.

The presence in the polymer of residues originating from the catalysts described above does not interfere with the process. As a matter of fact, these catalysts have a very high activity which is in general higher than 500 g. of polymer per g. of catalyst. In these catalysts, only a small quantity of transition metal derivative is present so that the activity with respect to the transition metal is always higher than 5,000 g./g. of metal. By using such catalysts, the quantity of transition metal derivatives present in the polymer is lower than 100 p.p.m., very often lower than 50 p.p.m.

Catalysts composed of a transition metal chemically fixed to a support are therefore well adapted to carry out the process according to the invention since the latter comprises no purification of the polymer. It is obvious that any other low pressure polymerization catalyst or catalytic system which is sufficiently active and in which the residues are sufficiently inert to be tolerated in the polymer are also suitable to carry out the invention for example a chromium oxide ($CrO_3$) on an inert support such as silica, alumina, a silica-alumina.

In addition to the monomer(s), diluent and catalyst, the polymerization medium may comprise other components generally intended to modify the properties of the polymer, for example the chain transfer agents such as hydrogen which are used to lower the molecular weight of the polymer, or to increase the distribution of the molecular weights.

The polymerization is carried out continuously in a reactor which is provided with an agitation system used to maintain the polymerization medium in turbulent movement. Monomers, diluent and catalyst are preferably fed continuously to the reactor. The reactor may have any shape provided the agitation is sufficient and its surface is large enough to permit the elimination of the heat produced by the polymerization. The polymer is preferably removed continuously as a suspension in the polymerization medium.

In order to prevent the dissolution of the polymer, the polymerization temperature is maintained at about 110° C. when ethylene is polymerized alone. When a copolymer of ethylene is produced, the upper temperature limit is lower, generally between 80 and 110° C. In general, the process is not carried out at temperatures lower than 60° C., otherwise the productivity would be too low.

The pressure inside the polymerization reactor is usually between normal pressure and 50 kg./cm.$^2$.

The polymer concentration of the polymerizable mixture varies mainly with the type of fibrillated structure which is to be obtained. As a matter of fact, the concentration of polymer determines to a certain degree the concentration of the mixture of diluent and melted polymer which is flashed instantaneously in the last step of the process of producing fibrillated structures. In general, the polymer suspension which exits from the reactor contains 5 to 35%, preferably 15 to 25% by weight of solid material with respect to the diluent, as will be shown hereinafter.

At the exit of the reactor, the suspension is introduced into an enclosure wherein components of the mixture which are gaseous and atmospheric pressure, i.e. ethylene, the low boiling comonomers and when present, the gaseous chain transfer agents are vaporized. The temperature and pressure of the degassing enclosure depends on the operating conditions of the polymerization reactor; in general, the low boiling components of the polymerization mixture are removed at a temperature of about 60°–110° C. The pressure is then regulated as a function of the desired expansion temperature so that it is at least about 0.5 atmosphere above the vaporization pressure of the diluent at the working temperature. For example, when the polymerization is carried out in hexane at a temperature of 100° C., the temperature in the degassing temperature is close to about 100° C. and the pressure maintained therein must be at least 3 atm. absolute, since the vaporization pressure of hexane at 100° C. is about 2.5 atm. absolute.

The expansion of the polymer suspension at a pressure between the pressure of the reactor and that of the gas removing enclosure can be carried out in any suitable device, for example in a valve for regulating the output flow of the reactor.

The gas removing enclosure contains a gaseous phase which comprises the vaporized ethylene which is recycled towards the polymerization reactor and a suspension of the polymer in the diluent. The suspension is agitated to keep it homogeneous, generally an agitator such as a mechanical stirrer is employed for this purpose. A portion of this suspension is continuously withdrawn by means of a pump and is transferred to the part of the equipment where heating takes place. The pump used to carry out this transfer is preferably of the centrifugal open wheel type.

In the heating equipment, the mixture is heated to a temperature which is sufficiently high to completely liquefy the polymer and the amount of heat accumulated is sufficient to completely vaporize the diluent. The minimum temperature value is mainly dependent on the thermodynamic properties of the diluent and on the concentration of the polymer in the mixture. The substantial amount of heat accumulated by the diluent and the melted polymer, and the heat given off during solidification of the polymer is used to vaporize the diluent during the last stage of production of the fibrillated structure, so that a lower concentration of polymer generally requires that the mixture be heated to a higher temperature. Similarly, the lower the specific heat of the diluent, the higher the temperature required. The minimum temperature which can be reached during heating may be calculated or determined by means of diagrams of enthalpy, or more simply by experimental determination.

The temperature to which the mixture is heated should not be higher than a predetermined value which also depends primarily on the concentration of the polymer and the nature of the diluent. If the heat taken up by the polymer and the diluent is too large, the quantity of heat used for vaporizing the diluent is insufficient to allow solidification of the polymer, i.e., there is an excess of heat and the polymer is then recovered in melted form and not as a fibrillated structure. The temperature is preferably comprised between 150 and 225° C. and the pressure between 20 and 100 kg./cm.$^2$. For example and more specifically, in the case of a 5% concentration of polymer in hexane, the temperature and pressure respectively 150° C. and 20 kg./cm.$^2$, 180° C. and 70 kg./cm.$^2$, 200° C. and 100 kg./cm.$^2$. For a 25% concentration in hexane the temperature and pressure are most preferably the following: 175° C.—20 kg./cm.$^2$, 225° C.—100 kg./cm.$^2$.

At the end of the heating operation, the mixture of polymer and diluent should be under a pressure at least equal to the autogenous pressure. The mixture is a homogeneous solution when the pressure is sufficiently high or a mixture of two liquid phases, one containing large quantities of polymer and the other containing little polymer, when the pressure is lower. The transition pressure between the single phase and the system comprising two liquid phases varies according to the natures of the polymer and diluent as well as the temperature and the polymer concentration.

In general, during the last stage of production of the fibrillated structures, it is desirable to expand mixtures comprising polymer and diluent which are free from solid impurities. For this reason the heated mixture is filtered. In order that filtration be carried out without difficulty, it is preferably carried out when the mixture is at a pressure higher than transition pressure, so that there is only a single liquid phase. Thus, the heating is preferably carried out under such conditions that the resultant mixture which is transferred to the filter comprises only a single liquid phase.

Any means can be used to obtain the temperature and pressure desired for the mixture of polymer and diluent. For example, the pressure of the polymer suspension in the diluent at the exit of the gas removing enclosure can be adjusted to the one intended at the exit of the filters increased by the losses of charge in the heating equipment and in the filters. The polymer is then melted and dissolved for example in heating vats provided with double jacket, or in tubular heat exchangers.

It is also possible to raise the pressure and to heat the mixture in a plurality of stages. An advantageous way of operating involves introducing the suspension to a heating vat by means of a pump, for example, of the open wheel centrifugal type. This vat, which is kept at a pressure between that of the monomer gas removing vat and that of the formation of fibrillated structure, is maintained at a temperature high enough to induce dissolution of the polymer. The pressure during heating should be sufficient to maintain the diluent in the liquid state. The vat is provided with an efficient agitation system to promote an exchange of heat. A portion of the polymer solution is then withdrawn and the pressure and temperature are adjusted to obtain a single liquid phase. For this purpose, a volumetric pump for example of the gear type may be used, followed by a tubular heat exchanger.

At the exit of the exchanger, the mixture of melted polymer and diluent is a single liquid phase which can be filtered without difficulty. Filters which are usually employed during melt spinning, for example, metallic screens may be used for this purpose. At the exit of the filters, the mixture is transferred to the low pressure enclosure in which the diluent is instantaneously volatilized. This transfer is carried out by means of a conduit opening into the enclosure through a single orifice extrusion die.

For a given polymer and diluent, the morphology of the fibrillated structures obtained by instantaneous volatilization of the diluent is mainly dependent on the temperature, pressure and concentration of the polymer in the mixture which is expanded as well as on the dimension and arrangement of the extrusion die.

Thus, when the polymer concentration in the mixture is high, there is obtained a cylindrical structure comprising substantially polyhedric cells. On the other hand, when the polymer concentration is low, instead of a unitary structure, there are obtained very short fibers which are more or less fibrillated. In the zone of intermediate concentrations, the instantaneous volatilization of the diluent produces a unitary structure consisting of fibrilla which are welded at the ends thereof to form a tridimensional network.

Therefore, notwithstanding the type of structure intended to be produced, it is essential to expand the diluent from mixtures having strictly constant compositions. Since the composition of these mixtures is identical to that of the polymer suspension which exits from the enclosure where volatilization of the monomers is carried out, a polymerization and regulating device is used which keeps the polymer content of the polymerization medium constant. When necessary, adjustments may be made, for example, by adding quantities of polymer or diluent in the dissolution vat. Desirably, these adjustments should be avoided as much as possible.

The structures which possess the best properties are those obtained from mixtures having intermediate concentrations. The specific surface thereof is very high and this permits their use as adsorbents and filters. As a result of their tridimensional structure, their volume is high with respect to their weight. They are therefore well adapted as heat insulators. Furthermore, the fibrillae from which they are made are very thin, e.g. of the order of 1 micron. They may therefore be used with great success to produce unwoven materials.

The mechanical properties of these fibrillated structures are remarkable. For example, the vapors of diluent which escape suddenly produce a substantial stretching of the solidified polymer with the result that the polymer macromolecules are oriented. These properties are substantially equivalent to those which are determined on multifilament which have been melt-spun and drawn under heat. It is surprising that these properties can be obtained without special treatment of the fibrillated structures.

The fibrillated structures can be obtained in broken form or as a continuous rove depending on whether the polymer concentration in the zone of intermediate concentrations is high or low. As a general rule, the polymer concentration in the polymerization medium should be between 5 and 35% by weight with respect to the diluent when it is desired to obtain fibrillated structures provided with better properties. The preferred range is between 15 and 25% by weight. The above ranges correspond to the zone of intermediate concentrations of the mixture intended to be submitted to a sudden volatilization for removing the diluent.

As stated above, the heating temperature should be selected within a range in which the limits are such that the polymer is completely liquid before the expansion, that complete volatilization of the diluent is possible and that the polymer can be solidified during the expansion. The heating temperature also has an influence on the morphology of the fibrillated structures. In general, the higher the above temperature, the higher the degree of fibrillation, and this temperature is advantageously kept strictly constant in order to obtain structures of uniform appearance. For this purpose, a thermostat may be mounted in the conduit used to feed the mixture of melted polymer and diluent to the extrusion die.

As stated above, the physical appearance of the mixture of molten polymer and diluent is dependent on the pressure which prevails. This pressure must be at least equal to the autogenous pressure in order to prevent the premature volatilization of the diluent. Depending whether the operating pressure is higher or lower than the transition pressure, the mixture which is expanded comprises a single liquid phase or two liquid phases in which one is finely dispersed into the other. The physical condition of the mixture has a predominant influence on the morphology of the fibrillated structures which are produced. It is therefore advantageous to keep the expansion mixture under constant pressure and this can be obtained advantageously by a preliminary slight expansion of the mixture in a valve in which the opening is automatically adjusted as a function of a pressure measurement taken above this valve in the conduit leading to the extrusion die.

The extrusion die may comprise a single orifice the size of which is adapted to the flow and to the physical properties of the mixture. The orifice may have any shape desired.

The low pressure enclosure in which volatilization of the diluent is carried out should be maintained at a temperature which is lower than the melting point of the polymer but sufficiently high to vaporize the diluent. The pressure should be substantially lower than the saturation pressure of the diluent at this specific temperature in order that volatilization of the diluent be carried out rapidly and nearly instantaneously. With the usual diluents, the pressure may be in the vicinity of atmospheric pressure. Generally the instantaneous vaporization zone is maintained at a pressure of about 1-1.5 atmospheres, a pressure slightly above atmospheric being preferred, in order that the introduction of air be prevented.

The continuous or discontinuous fibrillated structures formed by substantially instantaneous vaporization of the diluent are recovered in accordance with any known process, e.g. continuous band, rolling drum or spinning box. The vapors of the diluent are removed from the enclosure and led to a condenser. The removed diluent is recycled if desired, after purification to the polymerization reactor.

A particular embodiment of the process according to the invention is represented schematically in the annexed drawing and the invention is further described with reference thereto.

Polymerization is carried out in a vat type reactor 1 provided with a stirring propeller. The reactor is supplied with ethylene through conduit 2, a catalyst through conduit 3 and a diluent through conduit 4. Ethylene is introduced in gaseous form and the catalyst is in suspension or in solution in the diluent. Feeding is carried out continuously. The reactor is provided with a double jacket to permit the removal of the heat evolved during polymerization.

The polymer which is suspended in the polymerization medium is continuously removed at the bottom of the reactor and it is expanded in the valve 5 until it reaches a pressure which is equal to the one inside the gas removing enclosure 6 where it is subsequently introduced. The enclosure is maintained at a pressure of about 0.5 atmosphere above the vaporization pressure of the diluent and at a temperature about that of the polymerization reactor or slightly lower. Alternately the gas removing enclosure can be operated close to atmospheric pressure and at a temperature slightly lower than the boiling point of the diluent; this is accomplished by means of a double heating jacket. The removal of the gaseous ethylene which has not reacted during the polymerization and also of other volatile components, from the polymerization medium is carried out in this enclosure. The gas is removed at the upper portion of the enclosure through conduit 7; it is then recompressed until the polymerization pressure is attained and cooled down to polymerization temperature, after which it is reintroduced inside the polymerization reactor via conduit 2.

The suspension of the polymer in the diluent is withdrawn through the bottom of the enclosure by means of the open wheel centrifugal pump 8. The polymer suspension is introduced into the liquefying vat 9 in which the temperature is slightly higher than the melting temperature of the polymer. The pressure of the suspension at the exit of the pump 8 should be at least equal to the pressure of saturation of the diluent measured at the temperature which exists in the liquefying vat 9. Vat 9 is heated with a double jacket and is provided with a stirring impeller and a conduit 10 to permit feeding of diluent or polymer when necessary in order to maintain the concentration of the polymer constant.

The mixture present in vat 9 is preferably in the form of a mixture of two liquid phases which are finally dispersed in one another. The mixture is continuously removed through the bottom of the vat by means of a constant flow gear pump 11. The flow at the exit of the equipment can be modified by recycling through recycling loop 12 a portion of the mixture which exits from the pump 11.

The mixture is then allowed to pass inside tubular heat exchanger 13. At the exit of exchanger 13, the temperature and the pressure of the mixture are raised so that the mixture is in a single liquid phase which is thereafter filtered in one of the filters 14 one of which may be put out of service; also the filters may be by passed entirely.

The mixture is then transferred to the extruder 15. The pressure above the extruder is maintained at a given value by means of an automatic regulator 16 which acts on the valve 17.

The instantaneous volatilization of the diluent is carried out inside the enclosure 18. The fibrillated structures are deposited on the continuous band 19 which brings the same directly to the funnel 20 where they are evacuated. The vaporized diluent is evacuated at the upper part of the enclosure, liquefied in condenser 21 and recompressed to the polymerization pressure before being reintroduced through conduit 4 to the reactor 1.

The process of the invention is especially useful due to its simplicity and economy of means. Indeed, the starting material of the spinning operation is the polymer suspension as it exits from the polymerization reactor. The traditional operation comprising separating the catalytic residues, concentrating the polymer, separating the diluent and finishing the polymer are not required. The suspension is simply reheated and compressed in order to form one or two liquid phases which result from the physical equilibrium between the melt polymer and the diluent, and the suspension is introduced into a low pressure enclosure where it instantaneously forms fibrillated structures which have exceptional properties. As compared to classical processes for the production of short fibers, the production of fibrillated structures according to the invention has the advantage of doing away with various operations such as winding, twisting, sizing, stretching, cutting, etc. The characteristics and advantages of the invention is further illustrated by means of the following example. This example illustrates the best mode currently contemplated for carrying out the invention and must not be construed as limiting the invention in any manner.

Example

The process of the invention is carried out in an apparatus which is similar to the one which is schematically illustrated in the annexed sheet of drawings. It is used for the homopolymerization of ethylene.

Polymerization is carried out inside a vat type reactor having a capacity of 1,200 liters, provided with a helical stirrer and maintained at a temperature of 60° C. and a pressure of 30 kg./cm.². The reactor is continuously supplied with 102 kg. per hour of hexane, 27 kg. per hour of ethylene and 55 g. per hour of hydrogen, which serves as a chain transfer agent and is introduced while in solution in hexane.

The first component of the catalyst is triisobutyl aluminum. It is introduced in the polymerization medium at the rate of 8 g. per hour, while in solution in hexane. The second component is produced from magnesium oxide which has been dried by heating at 600° C. in a dry nitrogen atmosphere. The support is then impregnated with titanium tetrachloride for one hour at a temperature of 130° C. The impregnated support is introduced into the reactor as a suspension in hexane, at the rate of 45 g. of solid material per hour.

In the conduit which connects the reactor to the gas removing enclosure, the valve 5 whice is illustrated in the annexed sheet of drawings is replaced by a chamber which permits the intermittent withdrawal of a portion of the polymer suspension in the polymerization medium.

Through the bottom of the reactor there is removed a high density polyethylene suspension containing about 19.2% by weight of polymer with respect to hexane. The suspension is introduced into the gas removing enclosure while the latter is maintained at a pressure of 1.5 kg./cm.² and a temperature of 75° C. There is a release of about 2.75 kg. per hour of ethylene and 55 g. per hour of hydrogen. The enclosure comprises a vat having a capacity of 500 liters and the latter is provided with a helical stirrer and filled to about half capacity.

By means of an open wheel centrifugal pump, a portion of the polymer suspension in hexane is continuously withdrawn and is introduced into a vat where the polymer is melted. This vat which has a volume of 1,500 liters is provided with a helical stirrer and is maintained at 140° C. The pressure is the autogenous pressure. The polymer is melted and is mixed with hexane.

The mixture of melted polymer and hexane is taken over by a gear pump which raises the pressure thereof to 60 kg./cm.².

It is then reheated in a coil exchanger until it reaches a temperature of 180° C. In this manner, the mixture is always in the form of a single liquid phase. It is thereafter filtered on metallic screens in order to remove all solid particles having a diameter larger than 0.10 mm.

At the exit of the filter, the mixture is transferred to the extrusion die. The latter comprises a circular orifice having a diameter of 1 mm. and a length of 1 mm. The opening of the valve mounted above the filters is adjusted in order that the pressure in the conduit leading to the extruder is maintained in the vicinity of 25 kg./cm.².

The enclosure in which the instantaneous vaporization of hexane is carried out is maintained at a pressure of 1.1 kg./cm.² in order to prevent the entry of air. The vaporized hexane is recondensed in a condenser and recycled to the polymerization reactor by a centrifugal pump. The temperature inside the enclosure is in the vicinity of 110° C.

In the die, there is formed a continuous fibrillated structure having a large volume and which is made of very fine fibrillae (the thickness thereof is of the order of 1 micron). The specific surface of these structures is about 5 m.²/g. The fibrillae are oriented; the angle of orientation of the electronic diffraction is about 25°. The fibrillae are welded to one another at the extremities thereof. In this manner, they form a three dimensional network having the general shape of a thread.

The fibrillated structures are deposited in a random manner on a continuous band which unwinds slowly and they are afterwards led outside the enclosure. If the fibrillated structures are melted, there is obtained a polyethylene having a density of 0.959 and a melt index which is equal to 0.31.

At the exit of the funnel, there is obtained 24.25 kg. per hour of the above three-dimensional fibrillated mass.

What we claim and desire to secure by Letters Patent is:

1. A process for the production of fibrillated structures of a polymer selected from homopolymers and copolymers of ethylene containing more than 50 mole percent of ethylene which comprises
   (1) polymerizing or copolymerizing ethylene under low pressure at a temperature comprising between 60 and 110° C. in the presence of a transition metal catalyst having an activity higher than 5,000 g. of polymer per gram of metal present in the active elements of the catalyst and in admixture with an inert organic diluent having a boiling point lower than 120° C. under atmospheric pressure in which the resultant polymer is suspended at a concentration of 5 to 35% by weight with respect to the diluent,
   (2) separating unreacted ethylene from the mixture at a pressure of at least about 0.5 atmosphere above the vaporization pressure of the diluent,
   (3) heating the suspension of polymer and diluent at a temperature in the range of about 150° to 225° C. under at least autogenous pressure in order to retain said diluent in liquid form, said temperature being selected according to the concentration of the polymer in the diluent and the specific heat of the diluent to be high enough to provide sufficient heat for the subsequent complete and instantaneous vaporization of the diluent, and to liquify the polymer but low enough to permit the solidification of the polymer during said subsequent complete and instantaneous vaporization of said diluent,
(4) passing said thus heated mixture through an orifice and thereby forming a stream of said mixture of liquid polymer and diluent and
(5) expanding the thus formed stream of said mixture of liquid polymer and diluent under a pressure lower than the saturation pressure of the diluent at a temperature lower than the melting point of the polymer to produce complete, instantaneous vaporization of the diluent and solidification of the polymer whereby said polymer is recovered solvent-free in the form of a fibrillated tridimensional structure made of very thin oriented fibrillae.

2. Process according to claim 1, in which the activity of the catalyst is higher than 10,000 g. of polymer per g. of metal present in the active elements of the catalyst.

3. Processs according to claim 1, in which the catalyst comprises an organic derivative of a metal of Groups I, II, IIIa or IVa of the Periodic Table and the reaction product between a solid compound of a bivalent metal and a liquid derivative of a metal of groups IVb, Vb and VIb of the Periodic Table.

4. Process according to claim 1, in which the polymer contains more than 90% molar of ethylene in its molecule.

5. Processs according to claim 1, in which the diluent is selected from the group consisting of aliphatic or cycloaliphatic hydrocarbons.

6. Process according to claim 1, in which the polymer concentration in the polymerization medium is between 15 and 25 percent by weight with respect to the diluent.

7. A process according to claim 1 wherein said fibrillated structure in which said polymer is recovered has the shape of a thread and said structure is formed from said fibrillae which are welded to one another at their extremities.

8. A process according to claim 1 in which said at least autogenous pressure under which said suspension of polymer and diluent is heated is about 20 to 100 kg./cm.$^2$.

9. A process according to claim 1 in which said suspension of polymer and diluent is heated under a pressure and to a temperature such that a single liquid phase of said polymer and diluent is formed.

References Cited

UNITED STATES PATENTS

| | | | |
|---|---|---|---|
| 3,468,868 | 9/1969 | Marwil | 260—94.9 |
| 2,820,779 | 1/1958 | Dale | 260—94.9 |
| 2,825,721 | 3/1958 | Hogan et al. | 260—88.1 |
| 2,921,872 | 1/1960 | McGlamery | 260—94.9 X |
| 2,930,786 | 3/1960 | Cottle et al. | 260—94.9 |
| 2,943,082 | 6/1960 | Cottle | 260—93.7 |
| 3,083,410 | 4/1963 | McGlamery | 260—94.9 X |
| 3,377,329 | 4/1968 | Nolther et al. | 260—93.7 |
| 3,476,736 | 11/1968 | Kahve | 260—93.7 |
| 3,493,553 | 2/1970 | Hinton | 260—93.5 |

FOREIGN PATENTS 1,516,800  10/1966  France.

JOSEPH L. SCHOFER, Primary Examiner

W. F. HAMROCK, Assistant Examiner

U.S. Cl. X.R.

260—94.9 GD, 96